United States Patent [19]

Horie et al.

[11] Patent Number: 4,633,337
[45] Date of Patent: Dec. 30, 1986

[54] FLOPPY DISK DRIVING WITH SUITABLE ON-DELAY AND OFF-DELAY TIMING

[75] Inventors: Nobuyuki Horie, Yamarokoriyama; Yoshiki Nishioka, Tenri; Noriaki Sakamoro, Nara; Toshiaki Fujikawa; Toshihiro Yamanaka, both of Ikoma, all of Japan

[73] Assignee: Sharp Kabushiki Kaisha, Osaka, Japan

[21] Appl. No.: 715,292

[22] Filed: Mar. 25, 1985

[30] Foreign Application Priority Data

Mar. 30, 1984 [JP] Japan ............................ 59-64399

[51] Int. Cl.⁴ ........................... G11B 5/02; G11B 5/09
[52] U.S. Cl. .................................. 360/57; 360/61; 360/62; 360/63
[58] Field of Search ................. 360/57, 61, 63, 62, 360/66

[56] References Cited

U.S. PATENT DOCUMENTS 4,300,174 11/1981 Harman et al. ............... 360/66 X
4,442,463 4/1984 Krishnamurty et al. ......... 360/66 X
4,466,025 8/1984 Soejima ......................... 360/57 X

FOREIGN PATENT DOCUMENTS 56-117308 9/1981 Japan ................................. 360/57

Primary Examiner—Raymond F. Cardillo
Assistant Examiner—Alyssa H. Bowler
Attorney, Agent, or Firm—Birch, Stewart, Kolasch and Birch

[57] ABSTRACT

A floppy disk driving circuit comprises a memory circuit for storing a plurality of items of delay time of a pair of erase heads from the switching-ON and the switching-OFF of a read/write head for all the tracks of a floppy disk, a control circuit responsive to the memory circuit for controlling ON- and OFF-delay timing of the pair of erase heads based on the plurality of items of delay timing. The plurality of items of suitable timing are previously calculated in connection with the respective tracks of the disk and stored within the memory circuit.

3 Claims, 5 Drawing Figures

1

FLOPPY DISK DRIVING WITH SUITABLE ON-DELAY AND OFF-DELAY TIMING

BACKGROUND OF THE INVENTION

The present invention relates to the driving of a floppy disk and, more particularly, to the driving of a tunnel erase type floppy disk.

A conventional tunnel erase type floppy disk comprises a read/write (R/W) head and a pair of erasing heads positioned to the rear of the read/write head. The pair of erasing heads are operated for erasing both sides of data recorded by the read/write head, so that a non-data record area is provided between the tracks to assure compatibility.

Normally, because the record tracks are arranged to be coaxial, the outer portions of the record disk move more slowly than the inner portions of the disk. Each of the tracks contain an identification (ID) field for storing address information, a data field for storing data, and a gap. If while recording data into the floppy disk the read/write head and the pair of erasing heads are simultaneously operated and the track is improperly aligned, the pair of erasing heads may erroneously erase the data in the ID field, and may not conduct a tunnel erasure of the data field. Therefore, conventionally, the pair of erasing heads are operated as being delayed at a predetermined time after the read/write head is energized.

Because the outer tracks of the disk move more slowly than the inner tracks of the disk, a common predetermined delay time is not suitable for all the tracks.

Due to the usage of a common delay time, it may be difficult to delay the ON condition of each of the pair of erase heads at a satisfactory time with respect to all of the tracks.

SUMMARY OF THE INVENTION

Accordingly, it is an object of the present invention to provide an improved floppy disk driving method that provides a suitable time delay for turning ON an erasing head, the ON-delay time.

It is another object of the present invention to provide an improved floppy disk driving circuit for presenting suitable ON-delay timing data for all the tracks of a floppy disk.

It is a further object of the present invention to provide an improved floppy disk driving circuit that provides suitable ON-delay and a time delay for turning OFF a pair of erasing heads in connection with all of the tracks of a floppy disk.

Briefly described, in accordance with the present invention, a floppy disk driving circuit comprises memory means for storing a plurality of items concerning the delay time of an erasing head means in accordance with the switching-ON and switching-OFF of read/write head means for all the tracks of a floppy disk, and control means responsive to the memory means for controlling the ON- and OFF-delay timing of the erasing head means based on the plurality of items stored in the memory means. The plurality of items concerning suitable delay-times are previously calculated in connection with respect to the different tracks of the disk and stored within the memory means.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
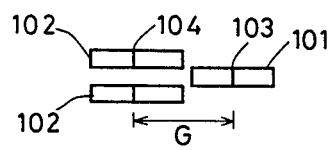
FIG. 1 is a schematic arrangement of a tunnel erase type floppy disk comprising a read/write head and a pair of erasing heads that are used in the present invention.

FIG. 1 is a schematic illustration of a tunnel erase type floppy disk comprising a read/write (R/W) head 101 and a pair of erasing heads 102 that are used in the present invention.

The pair of erasing heads 102 are positioned at the rear of the R/W head 101 with a gap G. Reference numeral "103" indicates a gap portion in the R/W head 102 and reference numeral "104" indicates a gap portion of each one of the pair of erasing heads 102. The distance between the gap portions 103 and 104 provides the gap G.

Figure 2:
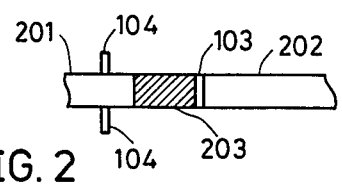
FIG. 2 is a schematic illustration representative of the relative position between the head and the recorded information in the disk upon starting the write operation in the arrangement of FIG. 1.

FIG. 2 is a schematic illustration, showing the relative position between the head and the data recorded in the disk upon the start of the write operation.

In FIG. 2, a gap 203 is formed between an identification (ID) field 201 that stores address information, and a data field 202. The gap 203 is to assure media compatibility and resistivity to the stretch and shrinkage of the media due to temperature change. When starting to record the data in the data field 202 the R/W head 101 is positioned at the head of the data field 202, and the pair of erase heads 102 are positioned near the ID field 201.

Figure 3:
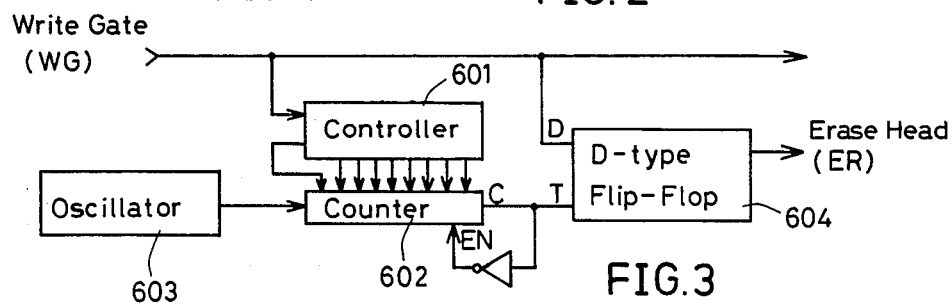
FIG. 3 is a block diagram of a floppy disk driving circuit according to the present invention.
Figure 4:
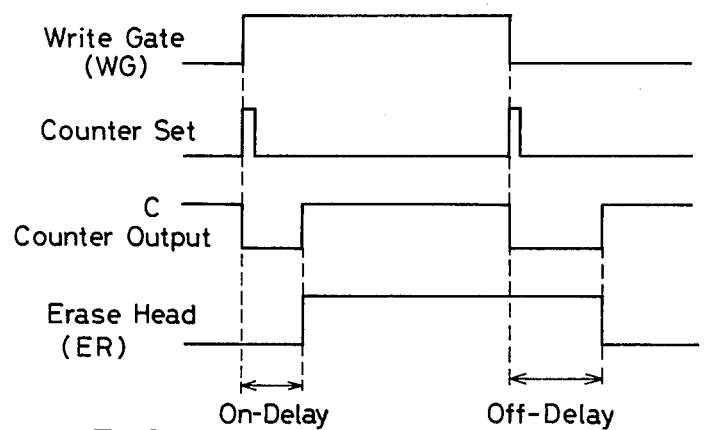
FIG. 4 is a timing chart of the signals occurring within the circuit of FIG. 3.

FIG. 3 is a block diagram of a floppy disk driving circuit according to the present invention. FIG. 4 is a timing chart of signals occurring within the circuit of FIG. 3.

According to a preferred embodiment of the present invention, a plurality of data items of suitable timing for selecting ON- and OFF-delay of the pair of erasing heads are previously calculated and stored within a memory. To write data into the floppy disk, the delay timing data are read-out from the memory, so that the ON- and OFF-delays can be carried out with suitable timing by a counter means based on the timing data readout from the memory means.

With reference to FIGS. 3 and 4, the floppy disk driving circuit of the present invention comprises a controller 601, a counter 602, an oscillator 603, and a D-type flip-flop 604. The controller 601 stores identification data for identifying both sides (0 surface and 1 surface) of a double-sided type floppy disk. A floppy disk driving controller (not shown) is provided for outputting a write data signal (WG) into the controller 601, so that the controller 601 is responsive to the rising of the write gate signal (WG) so as to output data in conformance with the tracks and the sides into the counter 602. The operation of the counter 602 is synchronized with that of the oscillator 603. When the counted number of the counter 602 is "0", the counter 602 outputs a high level signal "H" at its output terminal C. In the case where the counter 602 is an 8-bit counter and the oscillator 603 is of the type of 100 KHz, timing data of 10 micro seconds to 2550 micro seconds can be selected. The generation of the high level signal "H" permits an enable terminal of the counter 602 to be set in a low level. The high level signal of the output terminal C is inputted into the D-type flip-flop 604, so that the write gate signal (WG) which is delayed at the ON-delay timing is inputted into an erasing head driving means.

The ON-delay as used herein means the control of the erasing heads 102 is such that they are switched ON at a time after the read/write head 101 is switched ON in accordance with a specified time delay. With such a control, when said each of the pairs of erase heads 102 pass the ID field 201 (FIG. 2) of the floppy disk and reach the gap portion 203 (FIG. 2) of the floppy disk, the erase disk 102 is switched ON. Even if any OFF-track positioning may occur, the erase head 102 is prevented from erasing part of the ID data stored in the ID field 201.

Conventionally, if the pair of erasing heads 102 were switched OFF at the time when the R/W head 101 finished the write operation, a gap on the medium of a size equal to the gap between the R/W head 101 and the pair of erase heads 102, GAP G, could not receive the tunnel erase operation, so that excess data would remain in the gap portions, thereby damaging compatibility. Thus, conventionally, when the ON-delay time is too long some parts of the recorded data are not subjected to any tunnel erase operation. When it is too short, some parts of the ID field data may be erased. If too short an OFF-delay time is selected, some parts of the recorded data are not subjected to any tunnel erase operation.

According to the present invention, when the WG signal falls, the controller 601 provides data in conformance with OFF-delay time of a particular track and side of the disk into the counter 602. Thereafter, the counted number of the counter 602 is subsequently reduced. When the number becomes "0" and the counter 602 outputs a high level signal H at its output terminal C, the D-type flip-flop 604 provides a signal which delays the WG signal by the OFF-delay time.

In the description of FIG. 3, the oscillator 603 is provided for subsequently reducing the number of the counter 602 by "1" with its oscillation frequency. When the counter 602 has a number of "0", it provides a high level signal H. It may be possible that the counted number of the counter 602 is subsequently incremented by "1" in accordance with the oscillation frequency of the oscillator 603, whereby the overflow of the counter 602 enables the output of the high level signal "H" at the counter output C.

Figure 5:
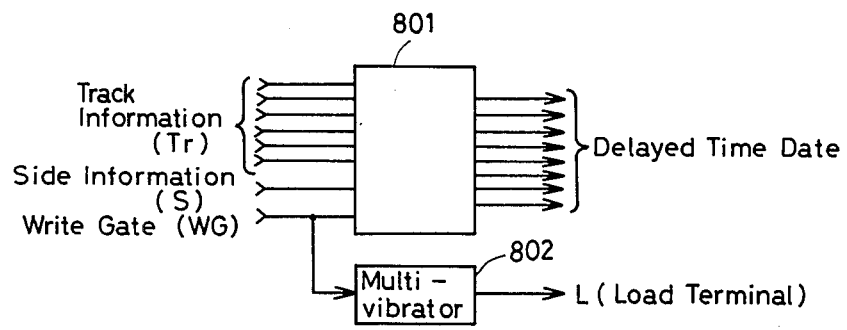
FIG. 5 is a block diagram of a controller of FIG. 2.

FIG. 5 is a block diagram of the controller 601. The controller 601 comprises a read only memory (ROM) 801 and a multi-vibrator 802. The ROM 801 stores track information, disk-side information, and a plurality of items of delay times at locations addressed by the high and low level signals of the write gate (WG) signal. The multi-vibrator 802 is operated for outputting a pulse signal to the load terminal L of the counter 602 to set it.

As described above, according to the present invention, a plurality of items of ON- and OFF-delay times corresponding to the tracks of a floppy disk as well as the information representative of either side of the floppy disk are stored in the controller 601. To read-in data to the floppy disk the ON- and OFF-delay data are read out, so that the ON- and OFF-delay operations are carried out at the suitable timing with the counter 602. The present invention prevents the erasure of the ID information upon starting the input of data due to any mistake in track positioning, and the tunnel erase operation can be completed at the end of the write operation.

While only certain embodiments of the present invention have been described, it will be apparent to those skilled in the art that various changes and modifications may be made therein without departing from the spirit and scope of the present invention as claimed.

What is claimed is:

1. A floppy disk driving circuit for writing information onto and reading information from a floppy disk having a plurality of concentric information storage tracks each identified by identification fields, comprising:

read/write means including a read/write head operatively disposed adjacent said floppy disk for storing information on a selected said track thereof, said read/write head being positioned in juxtaposition to a selected said track;

means for developing a write gate signal, said write gate signal enabling said read/write means to write information onto said selected said track of said floppy disk;

digital memory means for storing time interval data associated with each one of said plurality of tracks at a plurality of addresses associated therewith, said time interval data associated with said selected said track being developed as an output of said memory means;

oscillator means for developing clock pulses;

counter means enabled by the development of said write gate signal, for counting said clock pulses developed by said oscillator means, said counter means developing an erase enable output after a selected number of clock pulses have been counted, said counter means being operatively connected to said read only memory means and having a variable division ratio set by said time interval data provided by said memory means to thereby determine said selected number;

an erase head for tunnel erasing said selected said track; and flip-flop means responsive to said write gate signal and said erase enable output for developing a control output to drive said erase head, said flip-flop means developing said control output upon receipt of said write gate signal and said erase enable output and terminating development of said control output when both said write gate signal and erase enable output are not developed;

said drive circuit thereby driving said erase head to perform tunnel erasing on the entirety of said information storage track except said information field.

2. The floppy disk driving circuit of claim 1 wherein said memory means is a read only memory.

3. The floppy disk driving circuit of claim 2 wherein said flip-flop means is a D-type flip-flop.

* * * * *